April 9, 1935.   E. GRAEFE   1,997,055
GLASS CONTAINER AND METHOD OF PRODUCING THE SAME
Filed May 4, 1934
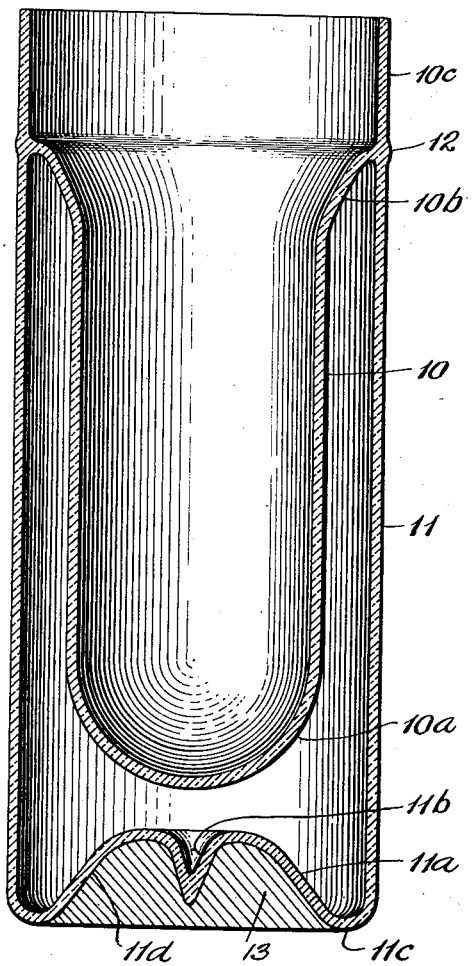
INVENTOR.
EDMUND GRAEFE
BY Max D. Ordmann
ATTORNEY Patented Apr. 9, 1935

1,997,055

UNITED STATES PATENT OFFICE 1,997,055

GLASS CONTAINER AND METHOD OF PRODUCING THE SAME

Edmund Graefe, Dresden, Germany

Application May 4, 1934, Serial No. 723,823

2 Claims. (Cl. 65—13)

This invention relates to improvements in the manufacture of drinking glasses. It is well known that in warm climates, particularly in the tropics, cool drinks as soon as they are poured into glasses, become warm. This is not due to the difference in temperature, but chiefly to the circumstance that owing to the great humidity of the tropical air, water condensates on the outer wall of the glass, and the latent condensation heat of the water vapor, as is well known, liberates 626 calories per unit, as a result of which the temperature of the drink is raised.

To obviate this objection I have constructed a drinking glass as a double wall glass of which the outer wall serves as an isolator, the space between the two being evacuated on the principle of the Dewar vessel. The ordinary Dewar vessel, as is well known, is made of thin glass and has a drawn out bottom with the fused tip of the evacuation outlet projecting downwardly therefrom, so that a metallic casing is required to protect the vessel and said tip from breaking. In contradistinction thereto, my vessel or container can be made of any kind of glass of comparatively great thickness, eliminating a casing. Furthermore, the bottom of the container is inverted with the fused off tip of the evacuation outlet projecting into the hollow of said bottom, the bottom serving both as a rest for the container and as a shield for said tip. A further novel feature of my container is that the inner wall is formed at its top with a cylindrical rim serving as a drinking edge and which in diameter is of the same size as that of the outer wall, so that it may serve as a support for the inner wall.

The manufacture of my new drinking glass is very simple. The two walls are formed by blowing two separate cylindrical vessels of about the same length, the inner vessel with the larger upper rim and an outer vessel with the inverted bottom and the evacuation outlet tip centrally projecting from said bottom into the hollow thereof. The two vessels are then placed into one another, so that the lower edge of the upper rim of the inner vessel rests on the upper edge of the outer vessel. The two vessels are then fused together at their junction and on evacuation of the space between said two vessels the tip is fused off.

The glass thus constructed has proved to retain the initial temperature for a considerable time as it is not affected by the condensation of the humidity of the air as above described.

My invention is more fully described by reference to the accompanying drawing in which similar characters denote corresponding parts and in which The figure is a vertical section of the container.

Referring first to the construction shown in the figure, the vessel or container 10 is composed of two vessels of substantially equal lengths and made of any suitable glass, including hard glass, and of any suitable thickness. The inner vessel is open on the top and has a semispherical bottom 10$^a$. Near its upper end it is formed with a conical portion 10$^b$ flaring upwardly and terminating in a cylindrical rim 10$^c$. The outer vessel 11 in width is of the same diameter as that of said rim. It is formed with an inverted bottom 11$^a$ having a central hollow tip 11$^b$, projecting downwardly from said bottom into the hollow thereof. The bottom edge 11$^c$ of said inverted bottom forms a rest for the container. The two vessels are produced by blowing them into the shape described. The two vessels thus shaped are placed one inside the other, so that the bottom edge of said cylindrical rim 10$^c$ rests on the upper edge of the outer vessel 11, and are then fused together as indicated by the slightly protruding annular bead 12. Thereupon, the space between the walls of the said two vessels is evacuated by the well known method through the evacuation outlet 11$^b$ and the latter sealed by fusing off said tip. The fusing together of the two vessels and the fusing off of the tip is effected by means of a blow lamp.

The manufacture of my new container is thus very simple and comparatively inexpensive. The two vessels can be blown into the shape described to be ready for assemblage in the above described manner.

If desired the hollow of the bottom after the fusing off of the evacuation outlet tip may be filled with some suitable filling material 13, so as to form a heavier solid base which will enhance the stability of the container, protect the tip and facilitate cleaning.

In use the liquid is poured into the glass just up to the level of the outer bead 12, the upper rim 10$^c$ serving as a drinking edge.

What I claim is:

1. A drinking glass or the like container composed of two interengaging glass vessels of substantially the same length but different widths, the inner vessel being formed with a semispherical bottom, a rim of the same diameter as that of the outer vessel, and said outer vessel having an inverted bottom and an evacuation outlet tip projecting into the hollow of said bottom, both said vessels being fused together at the junction of said rim and outer vessel and the space between said two vessels being evacuated through said tip and sealed by fusing off the latter, and a filling material in the hollow of said inverted bottom imbedding the said tip and increasing the stability of the container.

2. In a double walled heat insulated drinking glass of which the outer wall is formed with an inverted bottom and an evacuation outlet tip projecting into the hollow of said bottom, a filling material contained in the hollow of said inverted bottom imbedding said tip and increasing the stability of said glass.

EDMUND GRAEFE.